US006142429A

United States Patent [19]
Ahroni

[11] Patent Number: 6,142,429
[45] Date of Patent: Nov. 7, 2000

[54] MOUNTING CLIPS FOR A DRAPING DECORATIVE LIGHT STRING

[76] Inventor: Joseph M. Ahroni, 2701 W. Manor Pl. No. 204, Seattle, Wash. 98199

[21] Appl. No.: 09/237,202

[22] Filed: Jan. 25, 1999

[51] Int. Cl.[7] .......... F16L 3/08

[52] U.S. Cl. .......... 248/74.2; 248/68.1; 248/74.1; 362/249; 439/409

[58] Field of Search .......... 248/74.1, 74.2, 248/74.3, 68.1, 316.7, 315, 226.12, 227.1, 231.81; 362/249; 439/409

[56] References Cited

U.S. PATENT DOCUMENTS

| | | | |
|---|---|---|---|
| 2,408,045 | 9/1946 | Cottrell | 439/409 |
| 4,631,650 | 12/1986 | Ahroni | 362/249 |
| 5,330,368 | 7/1994 | Tsuruzono | 439/409 |
| 5,428,518 | 6/1995 | Huang | 362/267 |
| 5,653,411 | 8/1997 | Picco et al. | 248/74.1 |
| 5,672,000 | 9/1997 | Lin | 362/249 |
| 5,829,865 | 11/1998 | Ahroni | 362/249 X |
| 6,045,392 | 4/2000 | Daoud | 439/409 |
| 6,056,418 | 5/2000 | Hsu | 362/249 |

*Primary Examiner*—Anita M. King
*Assistant Examiner*—Tan Le
*Attorney, Agent, or Firm*—Seed IP Law Group PLLC

[57] ABSTRACT

A light string is configured by clips in multiple draping sections in progressively longer arcs which are vertically spaced apart and are spaced by connecting sections. The clips each have two complementing injection-molded plastic shells which snap-fit together to provide a horizontal wireway intersected by a downwardly extending wireway. One or both of the shells have a hook or other mounting element whereby the connecting sections are normally mounted in horizontal aligned positions.

10 Claims, 4 Drawing Sheets

MOUNTING CLIPS FOR A DRAPING DECORATIVE LIGHT STRING

TECHNICAL FIELD

The present invention relates to decorative light sets such as those with push-in type miniature bulb units, and more particularly to a system with mounting clips for attractively draping a string of lights.

BACKGROUND OF THE INVENTION

In my prior U.S. Pat. No. 4,720,773 there is shown a string of lights draping in a series of loops from tabs formed in a strap which may be mounted as a collar at the top of a Christmas tree so that the loops drape from the collar over the length of the tree. The strap may also be mounted in a straight line, for example, on an eave or other structure resulting in a horizontal series of side-by-side draping loops. My later U.S. Pat. No. 4,736,282 shows a different tree collar for draping loops of a light string having a 3-wire cord.

SUMMARY OF THE INVENTION

The present invention aims to provide an alternative draping configuration for decorative light sets and manner of mounting them.

By the present invention a light string is configured in multiple draping sections in progressively longer arcs which are vertically spaced apart. This is accomplished by the use of mounting clips which divide a light string in draping sections separated by connecting sections which are normally mounted horizontally by the aid of mounting elements provided by the clips. Each mounting clip has two complementing injection-molded plastic shells which snap-fit together to provide a horizontal wireway intersected by a downwardly extending wireway.

DETAILED DESCRIPTION OF THE INVENTION

Figure 1A:
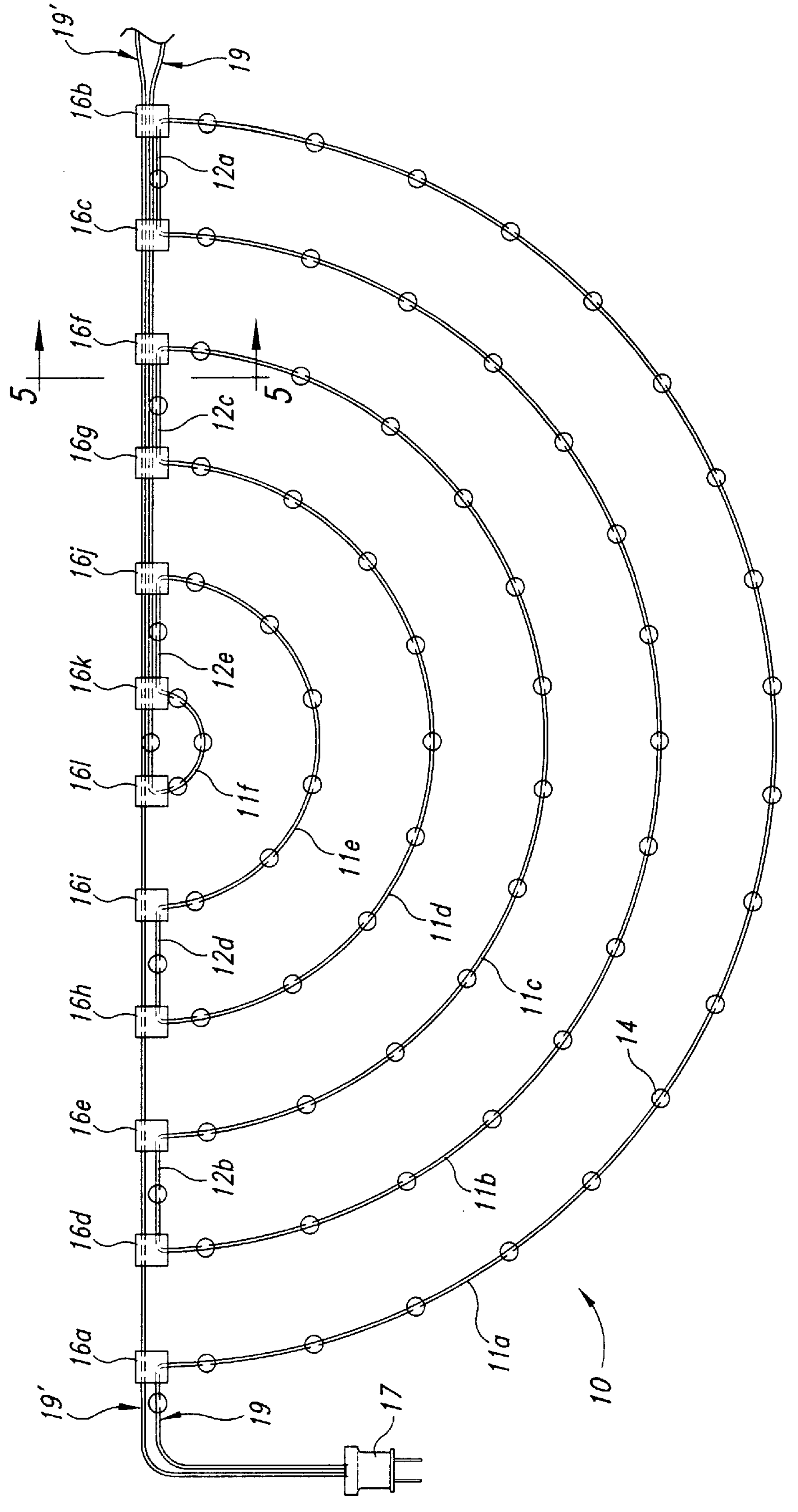
FIGS. 1A and 1B show the layout of dual strings of lights formed into multiple draping sections by the use of clips in accordance with the present invention.

Referring to FIG. 1A, it is seen that a string 10 of lights is arranged so that there are a plurality of draping sections 11*a*–11*f* which drape in vertically spaced arcs from aligned connecting sections 12*a*–12*e*. For purposes of example the string 10 is shown as having six draping sections and five connecting sections. Light units 14 are provided, preferably at regular intervals, on each draping section, and one or more light units may also be provided on the connecting sections.

To maintain the light string in the draping configuration a plurality of clips 16 is provided, one for each intersection of a draping section with a connecting section, plus one clip for one end of the longest draping section and the shortest draping section. The wires for the string 10 are preferably provided by a cord 19 of the type having two parallel insulated wires 19*a*–19*b* having their insulation 19*c* joined between the wires. The cord can also consist, for example, of two insulated wires which are wound together. The light units 14 can be of the push-in type shown, fore example, in U.S. Pat. Nos. 4,631,650 and 4,779,177, and 5,154,508, but having two rather than three wires in the cord.

Figure 1B:
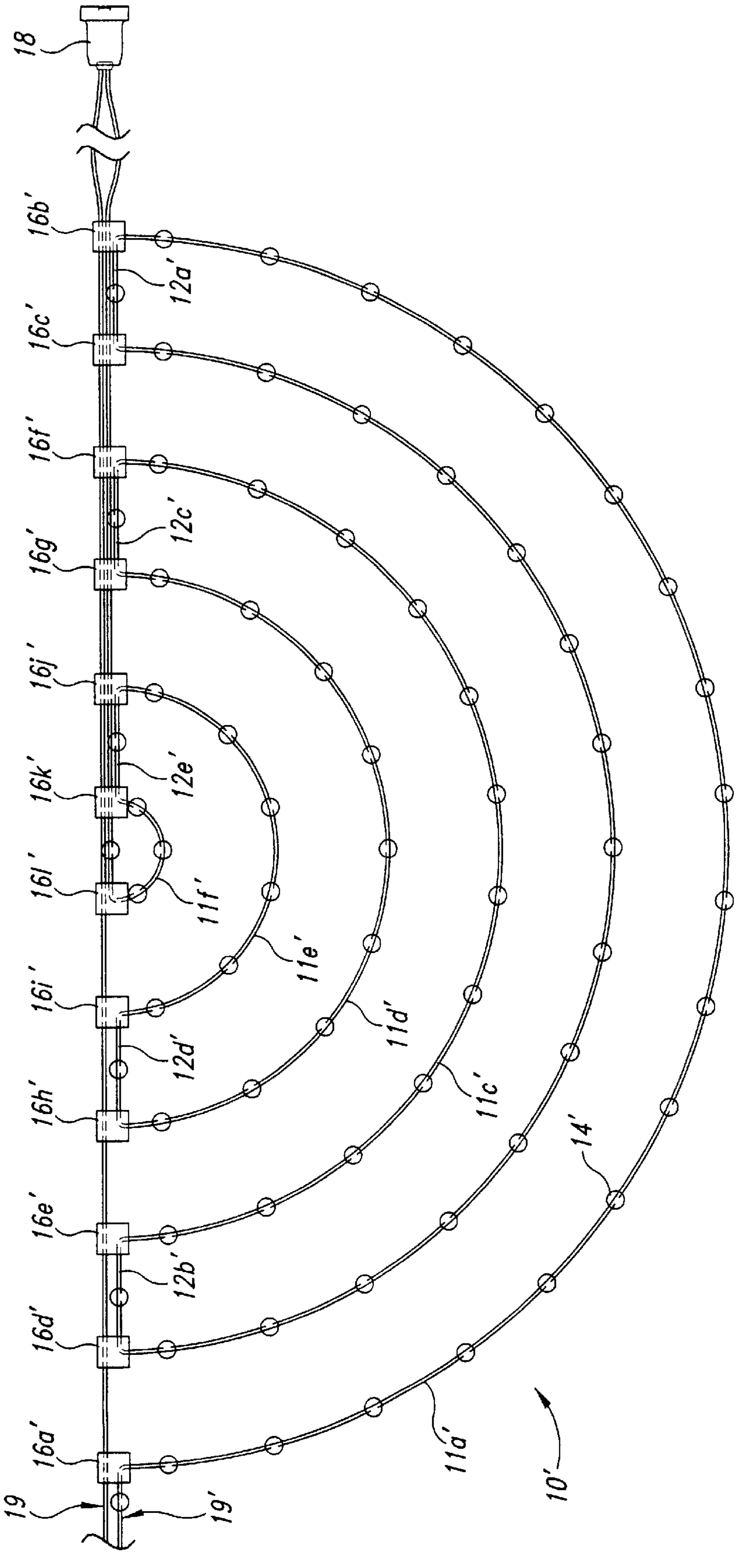

The cord 19 is connected to a wall plug 17 at one end and to an add-on plug 18 at the opposite end. Preferably a second string 10 of lights is arranged in the same draping fashion as the string 10 to occupy a position next to the string 10. This second string is shown in FIG. 1B and is marked in the same manner as the first string, but with the reference numerals followed by a prime. The cord 19' for the second string 10' is preferably also connected to the plug 17 and add-on plug 18. In this arrangement each of the two blades of the plug 17 and of the two internal contacts of the plug 18 has a wire from each cord 19–19' connected thereto.

The clip 16 has two mating front and back plastic shells 51–52 which are hinged together by a thin unitary plastic hinge connection along one longitudinal edge portion 53 and are snap-fitted together at the opposite side by a pair of prongs 54 on the front shell 51 fitting into openings 55 in the back shell 52. The shells 51–52 and hinge connection therebetween are injection molded as a unit.

Each prong 54 has a beveled overhanging head 54*a* which engages a respective ledge 56 at a step in the outer end of the registering opening 55. When the shells are swung together the tapered heads 54*a* ride over the inner edges of the ledges 56 and cause the prongs 54 to deflect sufficiently to snap-fit into locking engagement with the ledges 56.

The shells 51–52 are shaped to provide a longitudinal wireway 58 therebetween which is centrally intersected by a lateral wireway 59 located between the prongs 54 and provided by registering guideway channels 59*a*, 59*b* provided at the outer end portions of the shells. The longitudinal wireway 58 is formed by registering guideway channels 58*a*, 58*b* presented by the shells. These longitudinal guideway channels may be formed with arcuate grooves 58*c* to interfit with the longitudinal edge portions of cord 19.

At the clip locations at the ends of the draping sections 11 of the cord, the cord is normally bent to form an elbow portion which is then fitted into longitudinal channel 58*a* or 58*b* and the corresponding lateral channel 59*a* or 59*b* when the clip is in open position. When the clip is snapped closed, the elbow of the cord is trapped.

Figure 5:
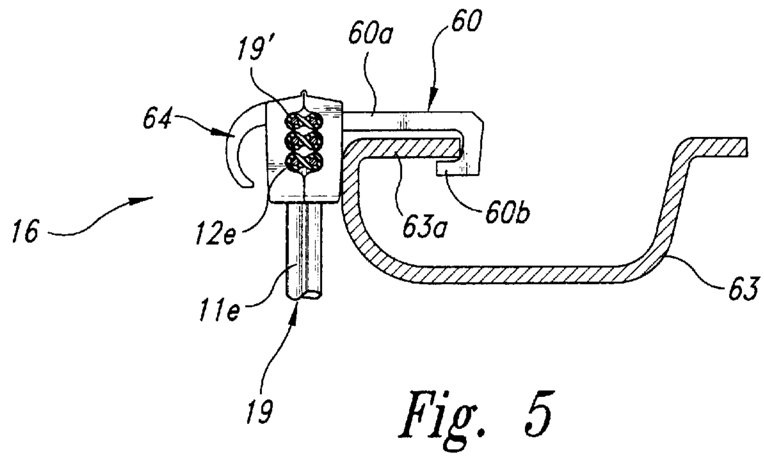
FIG. 5 is an end view of a clip in operative position and taken as indicated by line 5—5 in FIG. 1A.

As shown in FIG. 5, clip 16*f*, for example, has cord 19' and two parts of cord 19 stacked in its longitudinal wireway 58. The bottom one of these two parts bends downwardly within the clip from connecting section 12*c* to draping section 11*c*. Clips 16*b*, 16*c*, 16*g*, 16*j* and 16*k* similarly have their longitudinal wireway occupied by three stacked wire parts, whereas the rest of the clips only contain wire 19 and an elbow portion of cord 19.

The clips 16 are preferably provided with one or two mounting elements for engaging, for example, the outer lip of a roof gutter, or a stretched line or wire mounted preliminarily to support the draping set, or on the heads of nails. The shell 52 may be formed with an outwardly projecting hook 60 having an elongated shank 60*a* extending perpendicular to the outer face of the back shell 52 near the hinge end thereof and having a bill 60*b* aimed back at the shell 52. To aid in the injection molding of this bill the shell 52 is provided with a central opening 62 opposite the bill. As shown in FIG. 5, when the hooks 60 are used to mount the draping light string on a plastic or sheet metal roof gutter 63 of the type having an upper lip 63*a* along its outside upper edge, each hook 60 rests with its shank 60*a* on the gutter lip 63*a* and its bill 60*b* engaging the edge of the lip.

Figure 2:
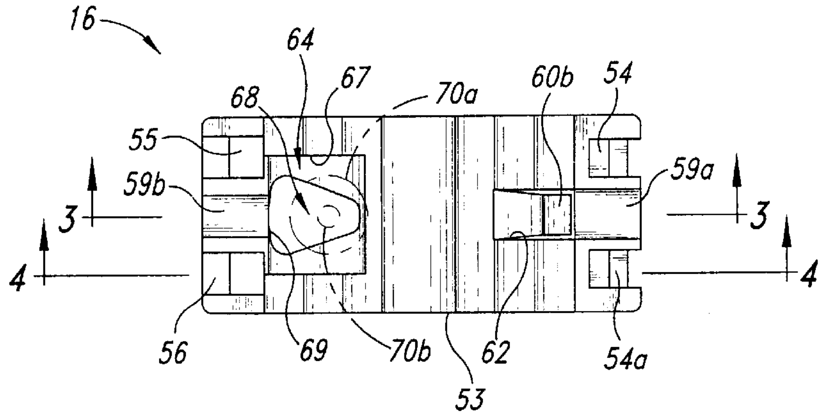
FIG. 2 is a view of one of the clips before it is closed.
Figure 3:
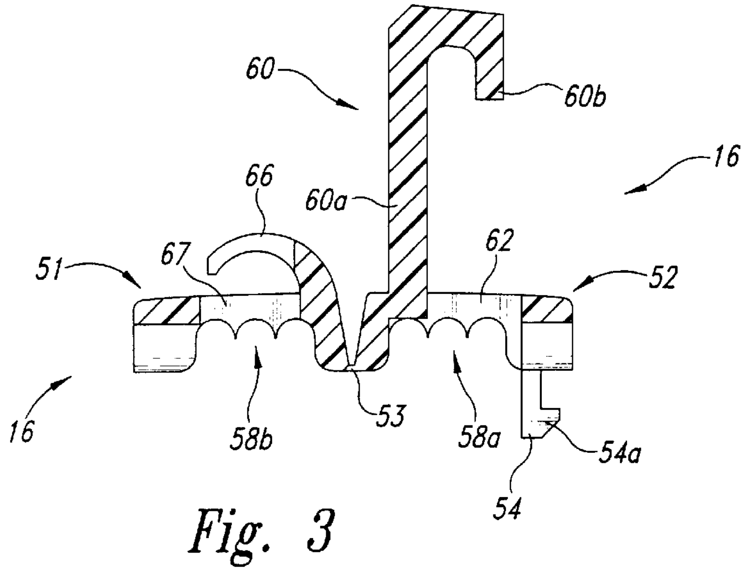
FIG. 3 is a sectional view through the clip taken as indicated by line 3—3 of FIG. 2.
Figure 4:
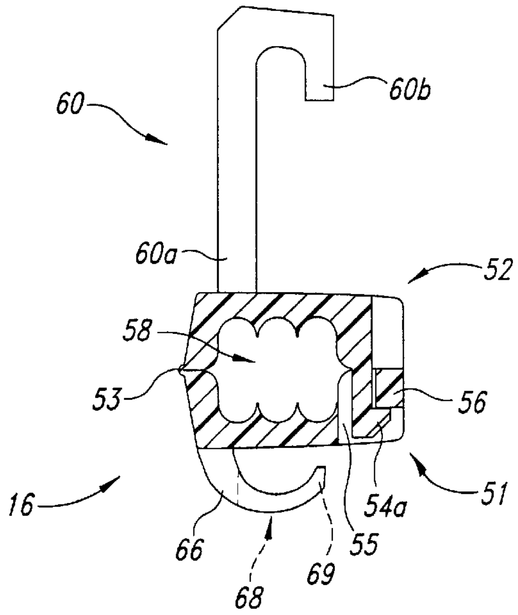
FIG. 4 is a sectional view through the clip taken as indicated by line 4—4 of FIG. 2, but with clip closed.
Figure 6:
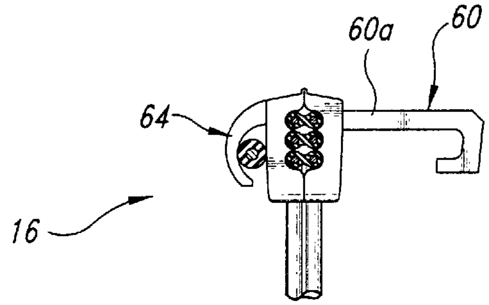
FIG. 6 is an end view of a clip taken as in FIG. 5 but showing the second hook in operation.

An alternative hook 64 may be provided on the outside of the front shell 51 so that the clip can be hung from a line or wire 65 as indicated in FIG. 6. To aid in the injection molding of this hook 64 the shell 51 is preferably provided with a central opening 67. The significance of the openings 62 and 67 can be seen in FIG. 2 which shows the clip as it is when released after being molded in a two-part mold.

Figure 7:
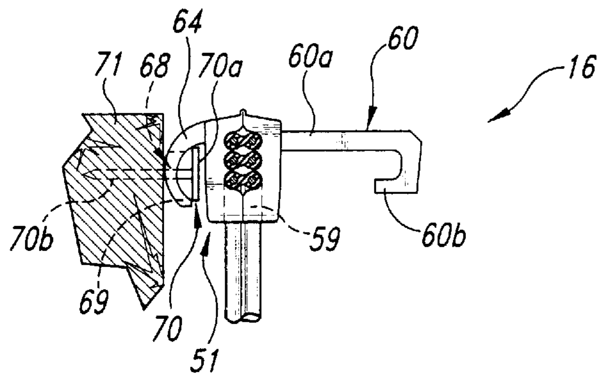
FIG. 7 is an end view of a clip taken as in FIG. 6 but showing an alternative mounting arrangement using the second hook.

To add an alternative mounting function for the hook 64 it may be formed with a pear shaped central opening 68 which widens and then narrows from a slot 69 which bisects the bill of the hook. The opening 68 and slot 69 enable the hook 66 to fit onto the head end portion of a nail 70 projecting from a support 71 as shown in FIG. 7. The halves of the hook 66 on both sides of the slot 69 are flexible enough that they can be sprung apart sufficiently to temporarily widen the slot for passage of nail shanks with a diameter greater than the normal width of the slot 69. The clip is positioned on the nail 70 by lowering the clip so that the head 70*a* of the nail is located between the hook 64 and the outer face of the shell 51. Then the slot 69 gives lateral passage for the nail shank 70*b* to enter the opening 68. A nail 70 is chosen which has a large enough head 70*a* to be retained behind the hook 66. In this regard, the nail head 70*a* can be of a size that the wider lower part of the hook opening 68 can pass over the nail head when the hook is pushed toward the nail head so that the lower part of the hook opening 68 will register with the nail head. Then the clip can be lowered so that the nail head is lodged behind the portions of the hook 64 adjoining the narrower end portion of the hook opening 68.

Returning to FIGS. 1A and 1B, it is seen that the cord 19' for the second draping string 10' extends through the longitudinal wireway 58 of each of the clips 16 for the first string 10, and that the cord 19 from the first string 10 extends through the longitudinal wireway of each of the clips for the second draping string 10'. In the illustrated example, the cord 19 passes from the plug 17 to the longitudinal wireway 58 of the first clip 16*a* wherein it bends downwardly at an elbow to exit through the other wireway 59 to start the longest drape section 11*a*. This section terminates at clip 16*b* which it enters from the bottom through wireway 59 and exits to the left through wireway 58 as the beginning of connecting section 12*a*. The latter in turn enters the left end of wireway 58 of clip 16*c* and bends downwardly through its wireway 59 to start draping section 11*b*. This in turn extends to clip 16*d* which it enters from the bottom and exits to the right as connecting section 12*b*. The latter extends to clip 16*e* to start draping section 11*c* which continues to clip 16*f* to start connecting section 12*c*. The same procedure continues to form draping section 11*d*, connecting section 12*d*, draping section 11*c*, connecting section 12*e*, and the shortest draping section 11*f* which extends between clips 16*k* and 16*l*. At the latter clip the cord 19 exits to the right and then passes together with cord 19' through the longitudinal wireways of clips 16*k*, 16*j*, 16*g*, 16*f*, 16*c*, and 16*b* in the recited order. Then the cord 19 passes through the longitudinal wireways 58 of all of the clips in the second string 10', and the cord 19' repeats in the second string the same pattern of alternating draping sections and connecting sections made by cord 19 as previously described respecting the first string 10. Then the cord 19' terminates at the add-on plug 18 together with the cord 19.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A clip for supporting wire parts of a decorative light string comprising:

front and back plastic shells each having top and bottom ends, and having side edges between said ends, said shells being hinged together at a hinge axis located at one of said ends to swing from an open position to a closed position whereat said shells have a locking interfit adjacent the other of said ends of the shells;

said shells each having an exposed side-to-side guideway extending between its side edges and having a bottom guideway extending from said side-to-side guideway to the bottom end of the shell;

said side-to-side guideways registering to form a side-to-side wireway and said bottom guideways registering to form a bottom wireway, when said shells are in said closed position, whereby an elbow part of a first wire can be positioned in the side-to-side guideway and bottom guideway of a selected one of said shells when said shells are in open position, and a straight part of a second wire can be positioned to occupy the full length of the side-to-side guideway of said selected one of said shells, when said shells are in open position, and whereby said elbow part then occupies a portion of said side-to-side wireway and the length of said bottom wireway, and said straight part occupies the full length of said side-to-side wireway, when said shells are swung together into said closed position;

and a mounting element extending from one of said shells.

2. A clip according to claim 1 in which said locking interfit is accomplished by a pair of locking hooks extending from one of said shells at opposite sides of the respective said bottom guideway, said locking hooks having a snap fit with a pair of shoulders presented by the other of said shells.

3. A clip according to claim 1 in which said mounting element has a hook configuration.

4. A clip according to claim 1 in which said mounting element comprises a bifurcated hook.

5. A clip according to claim 1 in which said mounting element comprises a hook having a bill with an opening therethrough from which an open-ended slot extends to receive the shank of a nail or like fastening having an enlarged head lodged behind said bill.

6. A clip according to claim 1 in which said mounting element has a central slot to receive the shank of a nail or like fastening having a head lodged between said mounting element and said back shell.

7. A clip according to claim 1 in which said mounting element extends from said back shell near the top end thereof.

8. A clip according to claim 7 in which a second mounting element extends from said front shell.

9. A clip according to claim 7 in which said mounting element is a hook having a bill overlying a central opening through said back shell.

10. A clip according to claim 1 in which said mounting element is a hook extending from said front shell near the top end thereof, said hook having a bill overlying a central opening through said front shell.

* * * * *